US012771505B1

(12) United States Patent
Guzelgoz et al.

(10) Patent No.: US 12,771,505 B1
(45) Date of Patent: Oct. 20, 2026

(54) METHOD AND APPARATUS FOR PROVIDING AN EQUALIZER THAT UTILIZES MODIFIED BACKWARD SUBSTITUTION FOR EQUALIZATION WEIGHT MATRIX GENERATION

(71) Applicant: Marvell Asia Pte Ltd, Singapore (SG)

(72) Inventors: Sabih Guzelgoz, San Jose, CA (US); Nagabhushana Kurapati, Milpitas, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 18/791,068

(22) Filed: Jul. 31, 2024

Related U.S. Application Data

(63) Continuation-in-part of application No. 17/964,759, filed on Oct. 12, 2022, now Pat. No. 12,289,185, which is a continuation-in-part of application No. 17/179,218, filed on Feb. 18, 2021, now Pat. No. 11,683,203, which is a continuation-in-part of application No. 16/404,029, filed on May 6, 2019, now Pat. No. 10,952,187.

(60) Provisional application No. 63/633,694, filed on Apr. 12, 2024, provisional application No. 63/350,432, filed on Jun. 9, 2022, provisional application No.
(Continued)

(51) Int. Cl.
*H04L 25/03* (2006.01)
*H04L 5/00* (2006.01)

(52) U.S. Cl.
CPC ...... *H04L 5/0048* (2013.01); *H04L 25/03949* (2013.01)

(58) Field of Classification Search
CPC ........................ H04L 5/0048; H04L 25/03949
See application file for complete search history.

(56) References Cited

U.S. PATENT DOCUMENTS 6,665,308 B1 * 12/2003 Rakib .................. H04L 27/362 370/479
7,173,990 B2 2/2007 Kim et al.
(Continued)

FOREIGN PATENT DOCUMENTS

CN 102415180 A 4/2012
CN 103493560 A 1/2014
(Continued)

OTHER PUBLICATIONS

Machine translation of DE-69434495-T2 (Year: 2006).
(Continued)

*Primary Examiner* — Janice N Tieu

(57) ABSTRACT

Method and apparatus for providing an equalizer that utilizes various weight interpolation schemes for equalization weight matrix generation. The equalizer receives a plurality of symbols of an uplink transmission in a wireless communication system having a plurality of subcarriers per a physical resource block (PRB) and performs an equalization operation on each of the plurality of received symbols of uplink transmission, wherein the equalization operation involves an equalization weight matrix. The equalizer calculates the equalization weight matrix for the equalization operation using a process for inversion of a first matrix, wherein the process includes a modified backward substitution step that calculates a second matrix during calculation of the inversion of the first matrix.

19 Claims, 9 Drawing Sheets

Related U.S. Application Data

62/978,700, filed on Feb. 19, 2020, provisional application No. 62/667,215, filed on May 4, 2018.

(56) References Cited

U.S. PATENT DOCUMENTS

| | | | |
|---|---|---|---|
| 9,325,451 B1 | 4/2016 | Kerhuel | |
| 11,683,203 B2 | 6/2023 | Guzelgoz et al. | |
| 2003/0076799 A1 | 4/2003 | Kwak et al. | |
| 2005/0157778 A1 | 7/2005 | Trachewsky et al. | |
| 2007/0183517 A1 | 8/2007 | Liu et al. | |
| 2008/0025427 A1 | 1/2008 | Lee et al. | |
| 2008/0123571 A1 | 5/2008 | Zhu et al. | |
| 2008/0151985 A1 | 6/2008 | Chin et al. | |
| 2008/0219341 A1 | 9/2008 | Kim | |
| 2009/0323774 A1* | 12/2009 | Bui | H04L 25/0244 375/144 |
| 2010/0135366 A1 | 6/2010 | Yuan et al. | |
| 2010/0182198 A1 | 7/2010 | Wen et al. | |
| 2011/0044383 A1 | 2/2011 | Maruyama et al. | |
| 2011/0051867 A1 | 3/2011 | Azadet et al. | |
| 2011/0228826 A1 | 9/2011 | Yokoo et al. | |
| 2011/0300849 A1 | 12/2011 | Chan | |
| 2012/0140808 A1* | 6/2012 | Dua | H04B 7/0854 375/229 |
| 2012/0184218 A1 | 7/2012 | Boudreau et al. | |
| 2012/0327757 A1 | 12/2012 | Wang et al. | |
| 2013/0028271 A1 | 1/2013 | Limberg | |
| 2013/0114755 A1 | 5/2013 | Cheng et al. | |
| 2014/0307768 A1 | 10/2014 | Gotman et al. | |
| 2016/0028558 A1 | 1/2016 | Guo | |
| 2016/0295561 A1 | 10/2016 | Papasakellariou | |
| 2017/0272282 A1 | 9/2017 | Abramov | |
| 2018/0049173 A1 | 2/2018 | Chen et al. | |
| 2019/0044673 A1 | 2/2019 | Maleki et al. | |
| 2019/0052422 A1 | 2/2019 | Yin et al. | |
| 2019/0159193 A1 | 5/2019 | Zhang et al. | |
| 2019/0253219 A1 | 8/2019 | Fan et al. | |
| 2019/0373584 A1 | 12/2019 | Guzelgoz et al. | |
| 2020/0178222 A1 | 6/2020 | Wang et al. | |
| 2020/0351135 A1 | 11/2020 | Moroga et al. | |
| 2021/0045071 A1 | 2/2021 | Maki et al. | |
| 2021/0058219 A1* | 2/2021 | Kimura | H04L 5/14 |
| 2021/0111823 A1 | 4/2021 | Choi et al. | |

FOREIGN PATENT DOCUMENTS

| | | |
|---|---|---|
| CN | 106534029 A | 3/2017 |
| CN | 109983723 A | 7/2019 |
| CN | 110401510 A | 11/2019 |
| JP | 200513898 A | 5/2005 |
| JP | 2007324748 A | 12/2007 |
| OA | 19979 A | 8/2021 |
| WO | 2019028717 A1 | 2/2019 |
| WO | 2019159568 A1 | 8/2019 |

OTHER PUBLICATIONS

Layton et al., "Improved Demapping for Channels with Data-Dependent Noise", EURASIP Journal on Wireless Communications and Networking (2018) 2018.123, pp. 1-12.

Xiaoming Yang, "Design and Implementation of SC-FDE and OFDM Combined Transmission Scheme for Anti-Jamming Communication", A Thesis for Master Degree, Beijing University of Posts and Telecommunications, May 30, 2019, 74 pages.

Office Action received for Chinese Application No. 20110192225.1 mailed on Feb. 19, 2025, 22 pages including English Translation.

Office Action received for Chinese Application No. 202110192225.1 mailed on Jul. 18, 2025, 7 pages including English Translation.

Request for th Submission of an Opinion received for Korean Application No. KR10-2021-022689 mailed on Mar. 2, 2025, 11 pages including English Translation.

* cited by examiner

METHOD AND APPARATUS FOR PROVIDING AN EQUALIZER THAT UTILIZES MODIFIED BACKWARD SUBSTITUTION FOR EQUALIZATION WEIGHT MATRIX GENERATION

CROSS-REFERENCE TO RELATED APPLICATIONS

The current application claims priority from U.S. Provisional Application No. 63/633,694 filed on Apr. 12, 2024, which is incorporated by reference herein in its entirety.

The current application is a continuation-in-part (CIP) of U.S. patent application Ser. No. 17/964,759 filed on Oct. 12, 2022. The Ser. No. 17/964,759 application claims priority from U.S. Provisional Application No. 63/350,432 filed on Jun. 9, 2022, which is incorporated by reference herein in its entirety.

The Ser. No. 17/964,759 application is a continuation-in-part (CIP) of U.S. patent application Ser. No. 17/179,218 filed on Feb. 18, 2021. The Ser. No. 17/179,218 application claims priority from U.S. Provisional Application No. 62/978,700 filed on Feb. 19, 2020, which is incorporated by reference herein in its entirety.

The application Ser. No. 17/179,218 is a continuation-in-part (CIP) of U.S. patent application Ser. No. 16/404,029 filed on May 6, 2019. The application Ser. No. 16/404,029 claims priority from U.S. Provisional Application No. 62/667,215 filed on May 4, 2018, which is incorporated by reference herein in its entirety.

FIELD

The exemplary embodiments of the present invention relates to telecommunications network. More specifically, the exemplary embodiments of the present invention relate to receiving and processing data streams using a wireless communication network.

BACKGROUND

With a rapidly growing trend of mobile and remote data access over a high-speed communication network such as Long Term Evolution (LTE), fourth generation (4G), fifth generation (5G) cellular services, accurately delivering and deciphering data streams become increasingly challenging and difficult. The high-speed communication network, which is capable of delivering information includes, but not limited to, wireless network, cellular network, wireless personal area network ("WPAN"), wireless local area network ("WLAN"), wireless metropolitan area network ("MAN"), or the like. While WPAN can be Bluetooth or ZigBee, WLAN may be a Wi-Fi network in accordance with IEEE 802.11 WLAN standards.

In 5G systems, reference signals may be included in uplink transmissions. These signals are used to estimate channel conditions or for other purposes. However, these signals are mixed in with data so that the reference signals must be accounted for when the data is processed. For example, when processing data received in resource elements, special processing may be needed to skip over resource elements that contain the reference signals. Even if the reference signals are set to zero or empty, their resource elements still need to be accounted for when processing the data.

Therefore, it is desirable to have a system that can efficiently demap received uplink transmissions while overcoming the disadvantages of conventional systems.

BRIEF DESCRIPTION OF THE DRAWINGS

The exemplary aspects of the present invention will be understood more fully from the detailed description given below and from the accompanying drawings of various embodiments of the invention, which, however, should not be taken to limit the invention to the specific embodiments, but are for explanation and understanding only.

DETAILED DESCRIPTION

Figure 1:
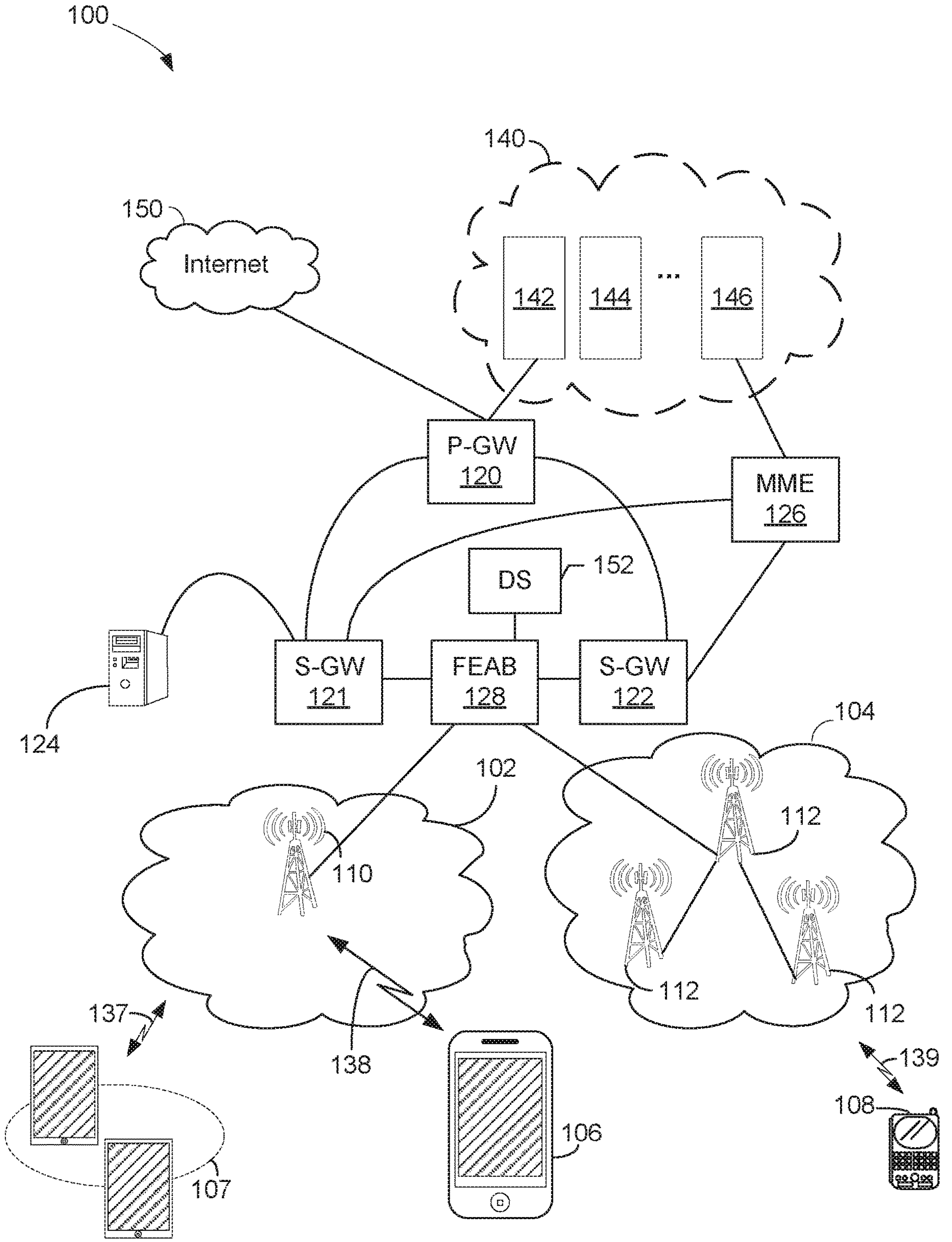
FIG. 1 shows a block diagram of a communication network in which uplink transmissions from user equipment are demapped by exemplary embodiments of a demapping system.

Aspects of the present invention are described herein the context of methods and apparatus for demapping data received in 5G uplink transmission.

The purpose of the following detailed description is to provide an understanding of one or more embodiments of the present invention. Those of ordinary skills in the art will realize that the following detailed description is illustrative only and is not intended to be in any way limiting. Other embodiments will readily suggest themselves to such skilled persons having the benefit of this disclosure and/or description.

In the interest of clarity, not all of the routine features of the implementations described herein are shown and described. It should be understood that in the development of any such actual implementation, numerous implementation-specific decisions may be made in order to achieve the developer's specific goals, such as compliance with application- and business-related constraints, and that these specific goals will vary from one implementation to another and from one developer to another. Moreover, it will be understood that such a development effort might be complex and time-consuming but would nevertheless be a routine undertaking of engineering for those of ordinary skills in the art having the benefit of embodiments of this disclosure.

Various embodiments of the present invention illustrated in the drawings may not be drawn to scale. Rather, the dimensions of the various features may be expanded or reduced for clarity. In addition, some of the drawings may be simplified for clarity. Thus, the drawings may not depict all of the components of a given apparatus (e.g., device) or method. The same reference indicators will be used throughout the drawings and the following detailed description to refer to the same or like parts.

The term "system" or "device" is used generically herein to describe any number of components, elements, sub-systems, devices, packet switch elements, packet switches, access switches, routers, networks, modems, base stations, eNB (eNodeB), computer and/or communication devices or mechanisms, or combinations of components thereof. The term "computer" includes a processor, memory, and buses capable of executing instruction wherein the computer refers to one or a cluster of computers, personal computers, workstations, mainframes, or combinations of computers thereof.

IP communication network, IP network, or communication network means any type of network having an access network that is able to transmit data in a form of packets or cells, such as ATM (Asynchronous Transfer Mode) type, on a transport medium, for example, the TCP/IP or UDP/IP type. ATM cells are the result of decomposition (or segmentation) of packets of data, IP type, and those packets (here IP packets) comprise an IP header, a header specific to the transport medium (for example UDP or TCP) and payload data. The IP network may also include a satellite network, a DVB-RCS (Digital Video Broadcasting-Return Channel System) network, providing Internet access via satellite, or a SDMB (Satellite Digital Multimedia Broadcast) network, a terrestrial network, a cable (xDSL) network or a mobile or cellular network (GPRS/EDGE, or UMTS (where applicable of the MBMS (Multimedia Broadcast/Multicast Services) type, or the evolution of the UMTS known as LTE (Long Term Evolution), or DVB-H (Digital Video Broadcasting-Handhelds)), or a hybrid (satellite and terrestrial) network.

FIG. 1 shows a block diagram of a communication network 100 in which uplink transmissions from user equipment are demapped by exemplary embodiments of a demapping system (DS) 152. The network 100 includes packet data network gateway ("P-GW") 120, two serving gateways ("S-GWs") 121-122, two base stations (or cell sites) 102-104, server 124, and Internet 150. P-GW 120 includes various components 140, such as billing module 142, subscribing module 144, and/or tracking module 146 to facilitate routing activities between sources and destinations. It should be noted that the underlying concept of the exemplary embodiments of the present invention would not change if one or more blocks (or devices) were added to or removed from diagram 100.

The network configuration 100 may also be referred to as a fourth generation ("4G"), Long Term Evolution (LTE), Fifth Generation (5G), New Radio (NR) or combination of 4G and 5G cellular network configurations. Mobility Management Entity (MME) 126, in one aspect, is coupled to base stations (or cell site) and S-GWs capable of facilitating data transfer between 4G LTE and 5G. MME 126 performs various controlling/managing functions, network securities, and resource allocations.

The S-GW 121 or 122, in one example, coupled to P-GW 120, MME 126, and base stations 102 or 104, is capable of routing data packets from base station 102, or eNodeB, to P-GW 120 and/or MME 126. A function of S-GW 121 or 122 is to perform an anchoring function for mobility between 3G and 4G equipment's. S-GW 122 is also able to perform various network management functions, such as terminating paths, paging idle UEs, storing data, routing information, generating replica, and the like.

The P-GW 120, coupled to S-GWs 121-122 and Internet 150, is able to provide network communication between user equipment ("UE") and IP based networks such as Internet 150. P-GW 120 is used for connectivity, packet filtering, inspection, data usage, billing, or PCRF (policy and charging rules function) enforcement, et cetera. P-GW 120 also provides an anchoring function for mobility between 4G and 5G packet core networks.

Base station 102 or 104, also known as cell site, node B, or eNodeB, includes one or more radio towers 110 or 112. Radio tower 110 or 112 is further coupled to various UEs, such as a cellular phone 106, a handheld device 108, tablets and/or iPad® 107 via wireless communications or channels 137-139. Devices 106-108 can be portable devices or mobile devices, such as iPhone®, BlackBerry®, Android®, and so on. Base station 102 facilitates network communication between mobile devices such as UEs 106-107 with S-GW 121 via radio towers 110. It should be noted that base station or cell site could include additional radio towers as well as other land switching circuitry.

To improve efficiency and/or speed-up extracting uplink control information received from any of the user equipment, a demapping system 152 is provided that operates according to one of three processing types. In an embodiment, demapping system 152 applies phase compensation to the received bits as a first stage of the demapping process. When a first type of processing is used, reference signals are removed from the received resource elements of an uplink transmission before layer demapping. After layer demapping is completed, soft demapping is then performed prior to descrambling. When a second type of processing is used, the received resource elements are despread before the soft demapping process. In this second case, reference signal removal and layer demapping is bypassed. In a third processing type, the received resource elements bypass RE removal, layer demapping and despreading and are input directly to a soft demapper. A more detailed description of the demapping system 152 is provided below.

Figure 2:
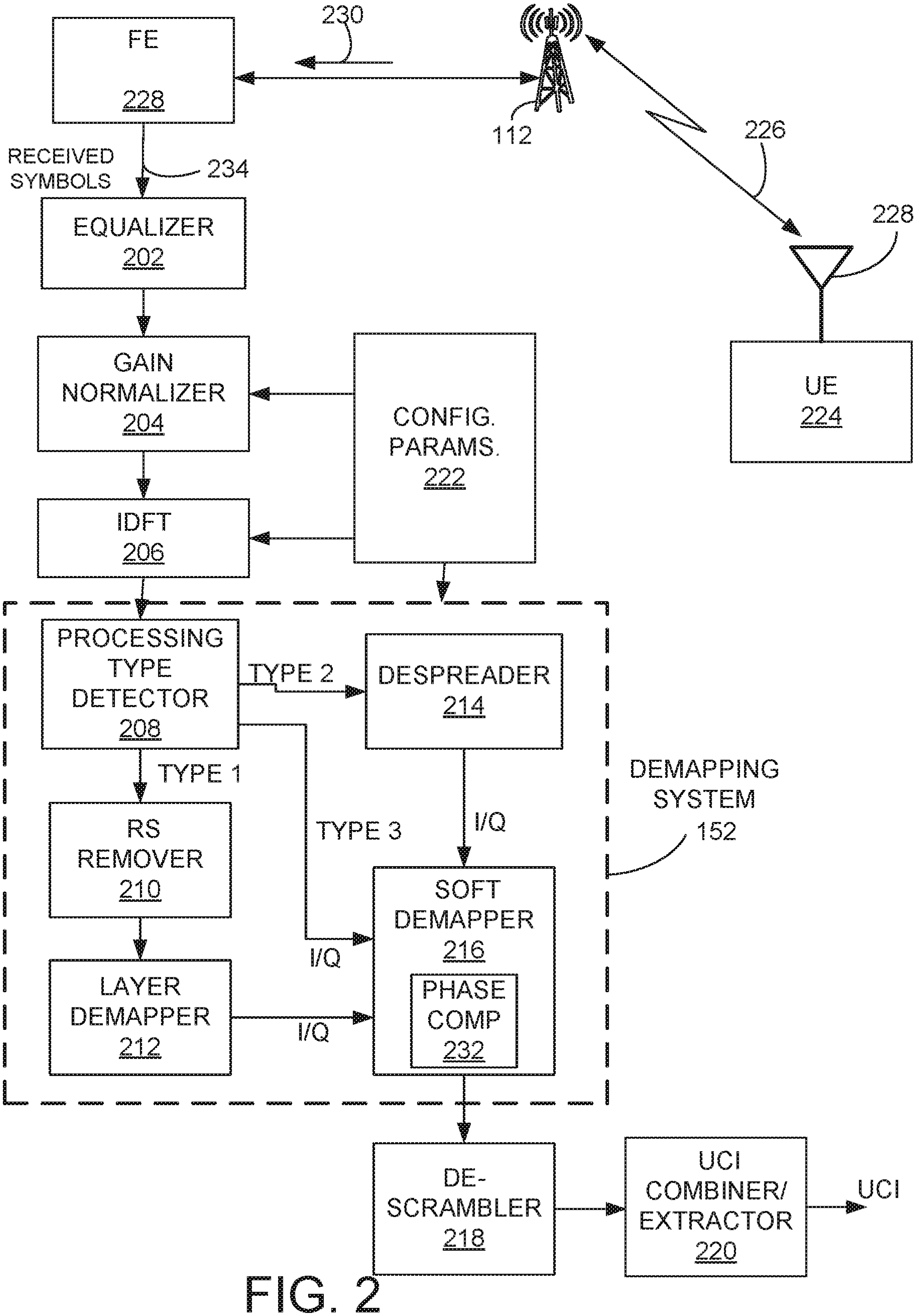
FIG. 2 shows an exemplary embodiment of a demapping system.

FIG. 2 shows an exemplary detailed embodiment of the demapping system 152 shown in FIG. 1. FIG. 2 shows user equipment ("UE") 224 having antenna 228 that allows wireless communication with base station 112 through wireless transmissions 226. The UE 224 transmits uplink communications 230 that are received by base station front end (FE) 228 that outputs received symbols 234 that include received reference symbols. In an embodiment, the base station includes equalizer 202, gain normalizer 204, inverse transform block (IDFT) 206, configuration parameters 222, the demapping system 152, descrambler 218, and combiner/extractor 220. In an exemplary embodiment, the demapping system 152 includes processing detector 208, RS (reference signal or symbol) remover 210, layer demapper 212, despreader 214, and soft demapper 216. In an embodiment, the soft demapper 216 includes a phase compensation circuit 232 that applies phase compensation to the input I/Q bits as a first stage of the soft demapping process. The output of the soft demapper 216 is input to the descrambler 218 and its output is input to the combiner/extractor 220 that produces decoded UCI information.

In an embodiment, the demapping system 154 processes 1 symbol at a time, which may come from multiple layers for NR, and the demapping system 154 processes the whole subframe or slot of a layer for LTE covering 1 ms transmission time interval (TTI), 7-OFDM symbol (OS) short(s) TTI, and 2/3-OS sTTI. The modulation order can be derived as follows.

1. ($\pi$/2) BPSK for NR
2. ($\pi$/2) BPSK for LTE sub-PRB, QPSK, 16QAM, 64QAM, and 256QAM Furthermore, demapping rules apply to constellations as defined in LTE (4G) and/or NR (5G) standards.

Equalizer (Block 202)

Figure 9:
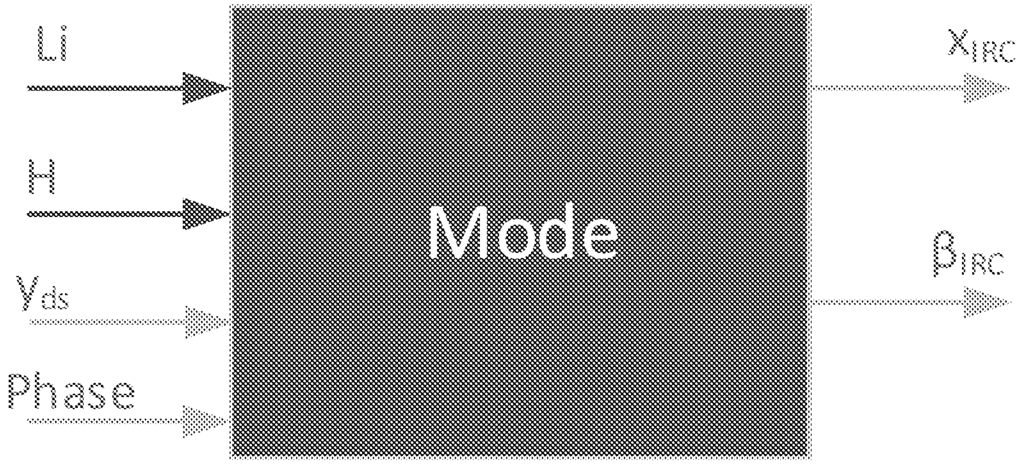
FIG. 9 depicts an example of a mode/equation of relationship between the transmitted and received data according to one aspect of the present embodiments.

In some embodiments, equalizer 202 is configured to accept/receive a plurality of symbols/data/samples 234 of an uplink transmission, and perform an equalization operation on the plurality of received symbols 234 of uplink transmission, wherein such equalization is an essential part of a receiver chain of a plurality of subcarriers in a wireless communication system. In some embodiments, the equalization operation performed by the equalizer 202 is minimum mean-squared error (MMSE)-based, which reduces the mean square error (MSE) of the plurality of received data to be as close to the original/transmitted data as possible. For a non-limiting example, under mode/equation shown in FIG. 9, relationship between the transmitted and received data can be expressed as follows:

$$y_{ds} = Hx + d$$

where transmitted symbol vector x goes through a multiplicative wireless communication channel H and an additive disturbance of interference and noise d, forming the plurality of received symbols $y_{ds}$. Under the example of FIG. 9, the equalizer 202 employs the MMSE-based equalization to generate an estimate $x_{IRC}$ for the transmitted data and one or more corresponding gain normalization factors $\beta_{IRC,i}$ for gain normalization from the plurality of received symbols $y_{ds}$, where an equalization weight matrix $W_{IRC}$ is formed as follows:

$$W_{IRC} = \left(H^h \hat{R}_d^{-1} H + I_{N_L}\right)^{-1} H^h \hat{R}_d^{-1} = \left((L_i H)^h L_i H + I_{N_L}\right)^{-1} (L_i H)^h L_i$$

where lower triangular matrix $L_i$, also known as the noise whitening matrix, is obtained from a noise covariance matrix $\hat{R}_d$ upon Cholesky Decomposition (CD) process below:

$$L = CD(\hat{R}_d) \text{ or } \hat{R}_d = LL^h \text{ and } L_i = L^{-1}$$

wherein the noise covariance matrix $\hat{R}_d$ covers noise covariance between noises of different elements of each vector.

Once the weight matrix $W_{IRC}$ is formed, the estimate $x_{IRC}$ and the gain normalization factor $\beta_{IRC,i}$ are obtained as follows:

$$x_{IRC} = W_{IRC} \cdot y_{ds}$$

$$\beta_{IRC,i} = w_{IRC,i} \cdot h_i \text{ for } i = 0, 1, \ldots, N_L - 1$$

$$= \text{diag}(W_{IRC} * H) = \text{diag}\left(\left(H^h \hat{R}_d^{-1} H + I_{N_L}\right)^{-1} H^h \hat{R}_d^{-1} H\right) = \text{diag}\left(\left((L_i H)^h L_i H + I_{N_L}\right)^{-1} (L_i H)^h L_i H\right)$$

where $W_{IRC,i}$ is the ith row of $W_{IRC}$ and $h_i$ is the ith column of H. and $H^h$ is a transpose, e.g., Hermitian transpose, of the H matrix.

The MMSE equalization described above performs matrix inversion. For matrix inversion, a matrix is defined as invertible if the product of the matrix and its inverse is the identity matrix. For example, the inversion of matrix M follows M*N=I, where matrix $N=M^{-1}$ is the inverse of matrix M. Matrix M is invertible if its inverse N can be calculated.

In some embodiments, the matrix inversion can be performed based upon a Cholesky process due to its low complexity. In some embodiments, the Cholesky process decomposes a Hermitian, positive-definite matrix, e.g., the H matrix, which is a matrix that is equal to its conjugate transpose, into a product of a lower triangular matrix and its conjugate transpose as discussed below. If the matrix is difficult to invert for a given precision during the MMSE equalization, however, the Cholesky process may fail, and the outcome generated by the failed Cholesky process may corrupt the entire data set after IDFT for the wireless communication system such as DFT-s-OFDM. One of the ways of to improve the matrix inversion under the Cholesky process is to increase the precision of the matrix inversion, which can be very costly in terms of time and resources consumed.

In some embodiments, the equalizer 202 is configured to complete the MMSE equalization operation on the plurality of received symbols using the Cholesky process with no change to the precision set/defined by a user even when matrix H is non-invertible. As a result, the equalizer 202 is configured to improve performance of the wireless receiver without adding any bits to the precision specified by the user when utilizing the Cholesky process for MMSE equalization as detailed below.

Under the Cholesky process, computation of N (the inverse of M) involves the following main processes/steps:

1) Cholesky decomposition (CD) of M, e.g., $\hat{R}_d$, $M=L*L^T$ so $L*L^T*N=I$, where L is a lower triangular matrix of M and I is an identity matrix;
2) Forward substitution, where L*F=I, where F is a forward substitution matrix;
3) Backward substitution, where $L^T*N=F$.

Regarding the Cholesky decomposition in Step 1), for the non-limiting example where M is defined as a 3×3 matrix, the Cholesky decomposition of A can be expressed as follows:

$$M = LL^T = \begin{pmatrix} L_{11} & 0 & 0 \\ L_{21} & L_{22} & 0 \\ L_{31} & L_{32} & L_{33} \end{pmatrix} \begin{pmatrix} L_{11} & L_{21} & L_{31} \\ 0 & L_{22} & L_{32} \\ 0 & 0 & L_{33} \end{pmatrix}$$

For a complex Hermitian matrix, the following formula applies:

$$L_{j,j} = \sqrt{M_{j,j} - \sum_{k=1}^{j-1} L_{j,k} L_{j,k'}^*}$$

$$L_{i,j} = \frac{1}{L_{j,j}} \left( M_{j,j} - \sum_{k=1}^{j-1} L_{j,k} L_{j,k'}^* \right) \text{ for } i > j$$

In some embodiments, the equalizer 202 is configured to calculate the equalization weight matrix for every subcarrier under the modified backward substitution process for each task, symbol, and PRB as follows:

1-Load/input H, Phase, channel interpolation weights, and $y_{ds}$ for all subcarriers per PRB;

2-Perform channel interpolation with phase compensation and/or re-compensation to calculate channel values for a certain symbol and subcarrier;

3-Calculate a full matrix of Li using the Cholesky decomposition process;

4-Calculate $A=L_iH$ with lower triangle multiplication and store output in Hermitian format;

5-Calculate $B=A^h*A+I_{N_L}$ with Hermitian multiplication and store output by using the output of Step 4;

6-Calculate an inverse matrix $Cinv=B^{-1}$ by pushing the output of Step 5 into a forward substitution and a modified backward substitution step following the Cholesky decomposition process;

7-Calculate diag(1−Cinv) via the modified backward substitution step without any additional step and report this value as $\beta_{IRC}$ to a shared memory for gain normalization;

8-Calculate $D=L_iy_{ds}$ with lower triangle multiplication;

9-Calculate $E=A^h*D$ by multiplying the outputs of Steps 4 and 8;

10-Calculate X=Cinv*E by multiplying the output of Step 6 and 9 and report this as $X_{IRC}$ to a shared memory to be processed by the subsequent block.

Figure 10:
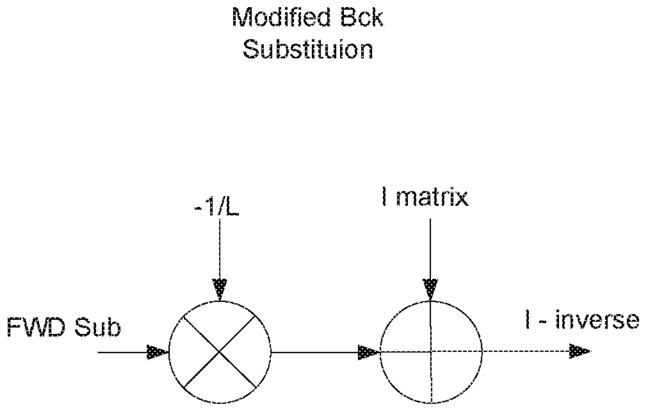
FIG. 10 depicts an example of a diagram illustrating a modified backward substitution process according to one aspect of the present embodiments.

Once $$B = A^h * A + I_{N_L} = H^h \hat{R}_d^{-1} H + I$$

has been calculated at Step 5 above, calculating $$\left(H^h \hat{R}_d^{-1} H + I_{N_L}\right)^{-1} H^h \hat{R}_d^{-1} H$$

in the equations above for $\beta_{IRC}$ equals calculating $B^{-1}*(B-I)$. Rather than calculating I−Cinv or $I-B^{-1}$ explicitly in Step 7 above, in some embodiments, the equalizer 202 is configured to calculate $I-B^{-1}$ during the calculation of the inverse matrix $Cinv=B^{-1}$ via a modified backward substitution step as part of the Cholesky decomposition-forward substitution-backward substitution process for matrix inversion. FIG. 10 depicts an example of a diagram illustrating a modified backward substitution process. Compared to a conventional backward substitution process, the modified backward substitution process further includes an additional addend of identity matrix I for $I-B^{-1}$ calculation in addition to conventional backward substitution step of using multiplicand 1/L to calculate $B^{-1}$. Under such modified backward substitution process, the explicit calculation of $I-B^{-1}$ or I−Cinv is eliminated, wherein this calculation is digested into the calculation of $B^{-1}$ or Cinv.

Gain Normalizer (Block 204)

In an embodiment, the gain normalizer 204 performs a gain normalization function on the received uplink transmission using the gain normalization factor $\beta_{IRC,i}$ following the equalization operation on the plurality of received symbols 234 by the equalizer 202. For example, the gain normalizer 204 is applicable to LTE and NR DFT-s-OFDM cases. Input samples will be normalized as follows per data symbol per subcarrier with a norm gain value calculated per symbol as follows.

$$\text{Gainnorm\_out}[Ds][sc] = (\text{Gainnorm\_in}[Ds][sc] / (\text{Norm\_Gain}[Ds])$$

In some embodiments, if both the estimate $x_{IRC}$ and the gain normalization factor $\beta_{IRC,i}$ are certain values (e.g., value zero) as set by the equalizer 202 discussed above, the gain normalizer 204 is configured to exclude the certain values of the gain normalization factor $\beta_{IRC,i}$ from the gain normalization calculation. In some embodiments, the gain normalizer 204 is configured to calculate an average of the gain normalization factor $\beta_{IRC,i}$, avg ($\beta_{IRC,i}$), with the certain values (e.g., value zero) excluded. The gain normalizer 204 is then configured to normalize the estimated $x_{IRC}$ data as $x_{IRC}=x_{IRC}/\text{avg}\ (B_{IRC,i})$ with the certain values excluded from the average of $\beta_{IRC,i}$ so that gain normalization on the plurality of received symbols will not be impacted. Note that the proposed approach is applicable to both DFT-s-OFDM and CP-OFDM systems while gain is expected to be more for DFT-s-OFDM systems since IDFT at the receiver side turns a local issue into a global one due to the spreading impact of the IDFT operation discussed below.

IDFT (Block 206)

The IDFT 206 operates to provide an inverse transform to generate time domain signals. In an embodiment, the IDFT 206 is enabled only for LTE and NR DFT-s-OFDM and LTE sub-PRB. In an embodiment, the inputs and outputs are assumed to be 16 bits I and Q values, respectively. The DFT and IDFT operations are defined as follows.

$$DFT: X[k] = \frac{1}{\sqrt{N}} \sum_{n=0}^{N-1} x[n] W_N^{kn} \text{ and}$$

$$IDFT: X[k] = \frac{1}{\sqrt{N}} \sum_{n=0}^{N-1} x[n] W_N^{-kn} \text{ where}$$

$$W_N = e^{-2\pi j/N}.$$

Configuration Parameters (Block 222)

In an embodiment, the configuration parameters 222 comprise multiple fields that contain parameters for use by multiple blocks shown in FIG. 2. For example, some of the configuration parameters 222 control the operation of the gain normalizer 204, IDFT 206 and demapping system 152. In an embodiment, the configuration parameters 222 may indicate that the gain normalizer 204 and the IDFT 206 are to be bypassed.

Processing Type Detector (Block 208)

In exemplary embodiments, the processing type detector 214 detects the type of processing to be performed by the system. For example, this information may be detected from the configuration parameters 222. In an embodiment, the processing type detector 208 operates to detect one of three processing types, which cover the operation of the system as follows.

1. Type 1-5G NR DFT-s-OFDM
2. Type 1-5G NR CP-OFDM
3. Type 2-5G NR PUCCH Format 4
4. Type 3-4G LTE DFT-s-OFDM
5. Type 3-4G LTE sub-PRB allocation RS Remover (Block 210)

In an embodiment, the RS remover 210 operates during Type 1 processing to remove RS resource elements from the received data stream to produce a stream of data that is input to the layer demapper. For example, the RE locations of the RS symbols are identified and the data is re-written into one or more buffers to remove the RS symbols to produce an output that contains only data. In an embodiment, Type 1 processing includes RS/DTX removal, layer demapping with an interleaving structure, soft demapping, and descrambling. A benefit of removal of RS before layering is to operate a single shot descrambling without any disturbance in a continuous fashion with no extra buffering.

Layer Demapper (Block 212)

Figure 3:
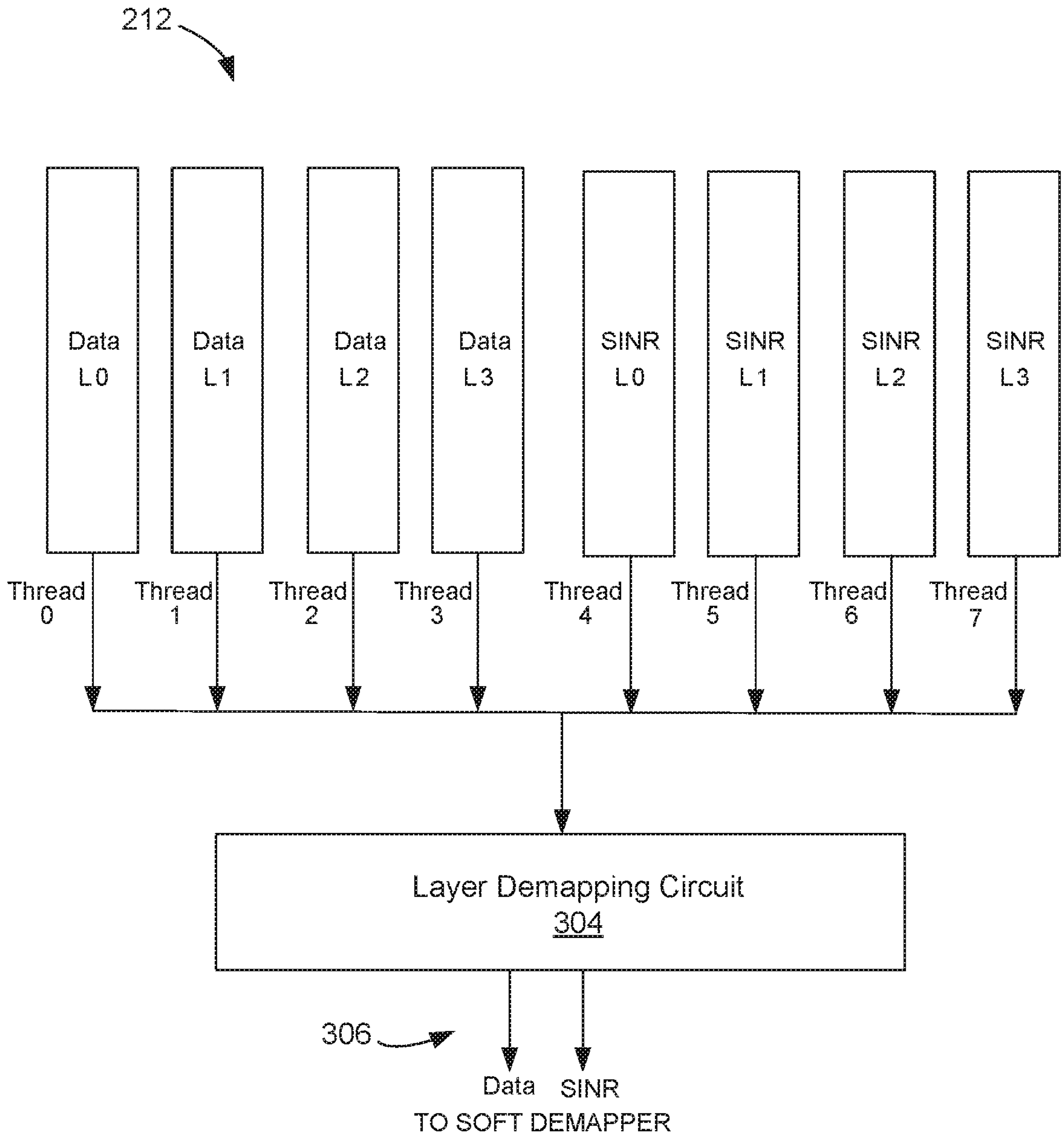
FIG. 3 shows an exemplary embodiment of a layer demapper for use in the demapping system shown in FIG. 2.

FIG. 3 shows an exemplary embodiment of layer demapper 212. In an embodiment, Data, and signal to interference noise ratio (SINR) coming from multiple layers Data(L0-L3) and SINR(L0-L3) of a certain subcarrier will be transferred into a layer demapping circuit 302 via multi-threaded read DMA operation. In this case, each thread will point to the memory location of different layers for a certain symbol as shown in FIG. 3. The layer demapping circuit 302 produces demapped data and multiple pSINR reports per layer. In an embodiment, for NR the DMRS/PTRS/DTX REs will be removed from the information stream prior to soft demapper both from I/Q and SINR samples.

Referring again to FIG. 2, additional blocks of the demapping system 152 are described in detail below.

Despreader (Block 214)

In an embodiment, the despreader 214 provides despreading for PUCCH Format 4 only. It consists of combining the repeated symbols along the frequency axis upon multiplying them with the conjugate of the proper spreading sequence. The spreading sequence index as well as the spreading type for combining the information in a correct way will be given by the configuration parameters 222. This process is always performed over 12 REs in total. The number of REs that will be pushed into subsequent blocks will be reduced by half or ¼th after despreading depending upon the spreading type. Combined results will be averaged and stored as 16-bit before soft demapping.

Soft Demapper (Block 216)

In an embodiment, the soft demapper 216 includes the phase compensation circuit 232 that acts as a first stage to perform phase compensation of the received I/Q signals before soft demapping. A more detailed description of the phase compensation circuit 232 is provided below. The soft demapping principle is based on computing the log-likelihood ratio (LLR) of a bit that quantifies the level of certainty on whether it is logical zero or one. Under the assumption of Gaussian noise, LLR for the i-th bit is given by:

$$LLR_i = \ln\left(\frac{P(\text{bit}_i = 0/r)}{P(\text{bit}_i = 1/r)}\right) =$$

$$\ln\left(\frac{\sum_j e^{\frac{-(x-c_j)^2}{2\sigma^2}}}{\sum_k e^{\frac{-(x-c_k)^2}{2\sigma^2}}}\right) = \ln\left(\sum_j e^{\frac{-(x-c_j)^2}{2\sigma^2}}\right) - \ln\left(\sum_k e^{\frac{-(x-c_k)^2}{2\sigma^2}}\right)$$

where $c_j$ and $c_k$ are the constellation points for which i-th bit takes the value of 0 and 1, respectively. Note that for the gray mapped modulation schemes given in [R1], x may be taken to refer to a single dimension I or Q. Computation complexity increases linearly with the modulation order. A max-log MAP approximation has been adopted in order to reduce the computational complexity. Note that this approximation is not necessary for QPSK since its LLR has only one term on both numerator and denominator.

$$\ln\sum_m e^{-d_m} \cong \max(-d_m) = \min(d_m)$$

This approximation is accurate enough especially in the high SNR region and simplifies the LLR calculation drastically avoiding the complex exponential and logarithmic operations. Given that I and Q are real and imaginary part of input samples, the soft LLR is defined as follows for (π/2) BPSK, QPSK, 16QAM, 64QAM, and 256QAM, respectively.

It should be noted that (π/2) BPSK is only applicable to NR DFT-s-OFDM and LTE sub-PRB cases. There are two flavors of this modulation format. For the first case, the constellation is shifted by (π/2) across subcarriers along the frequency axis. Hence, the demapper will change the demapping rule from subcarrier to subcarrier with the order specified below. For the other scenario, the demapping rule will stay the same along the frequency axis and soft demapper will always generate LLRs using the first rule specified below. This behavior of changing the LLR generation rule across frequencies or not will be controlled by a configuration parameter.

In an embodiment, the soft demapper 216 includes a first minimum function component ("MFC"), a second MFC, a special treatment component ("STC"), a subtractor, and/or an LLR generator. A function of soft demapper 216 is to demap or ascertain soft bit information associated to received symbols or bit streams. For example, soft demapper 216 employs soft demapping principle which is based on computing the log-likelihood ratio (LLR) of a bit that quantifies the level of certainty as to whether it is a logical zero or one. To reduce noise and interference, soft demapper 216 is also capable of discarding one or more unused constellation points relating to the frequency of the bit stream from the constellation map.

The STC, in one aspect, is configured to force an infinity value as one input to the first MFC when the stream of bits is identified and a special treatment is needed. For example, a predefined control signal with a specific set of encoding categories such as ACK with a set of predefined encoding categories requires a special treatment. One of the special treatments, in one aspect, is to force infinity values as inputs to MFCs. For example, STC force infinity values as inputs to the first and the second MFCs when the stream of bits is identified as ACK or RI with a predefined encoding category. The STC, in one instance, is configured to determine whether a special treatment (or special treatment function) is required based on received bit stream or symbols. In one aspect, the 1-bit and 2-bit control signals with predefined encoding categories listed in Table 1 require special treatments. It should be noted that Table 1 is exemplary and that other configurations are possible.

TABLE 1

| No. | Control Signal with Encoding Categories | Renamed Categories |
|---|---|---|
| 1 | $O^{ACK}$=1 | ACK [1] |
| 2 | $O^{ACK}$ = 1 ACK bundling | ACK [2] |
| 3 | $O^{ACK}$ = 2 | ACK [3] |
| 4 | $O^{ACK}$ = 2 ACK bundling | ACK [4] |
| 5 | $O^{RI}$ = 1 | RI [1] |
| 6 | $O^{RI}$ = 2 | RI [2] |

Table 1 illustrates six (6) exemplary control signals with predefined encoding categories. To simplify forgoing description, six (6) control signals are renamed or referred to as ACK [1], ACK [2], ACK [3], ACK [4], RI [1], and RI [2], respectively. For example, 1-bit ACK "OACK=1" is referred to as ACK [1] and 1-bit ACK bundling is referred to as ACK [2]. 2-bit ACK "OACK=2" is referred to as ACK [3] and 2-bit ACK bundling is referred to as ACK [3]. Similarly, 1-bit RI "ORI=1" is referred to as RI [1] and 2-bit RI "ORI-2" is referred to as RI [2]. Note that ACK [1] indicates that ACK control signal with one (1) bit to indicate its value and ACK [3] indicates that ACK control signal uses two (2) bits to indicate its value. ACK bundling reduces the number of ACKs to be transferred in TDD-LTE (Time Division Duplexing LTE) networks by a logical AND operation between the ACKs belonging to multiple downlink subframes.

Descrambler (Block 218)

The descrambler 218 is configured to generate a descrambling sequence of bits or a stream of bits. For example, after generating a sequence in accordance with the input value, the descrambler determines whether sequence modification is needed for certain categories of control information. The stream of bits or sequence is subsequently descrambled to produce a set of descrambled soft bits.

Combiner/Extractor (Block 220)

The combiner/extractor 220 provides a combining and extracting function to combine descrambled soft bits from the descrambler 218 and extract Uplink Control Information ("UCI").

Figure 4:
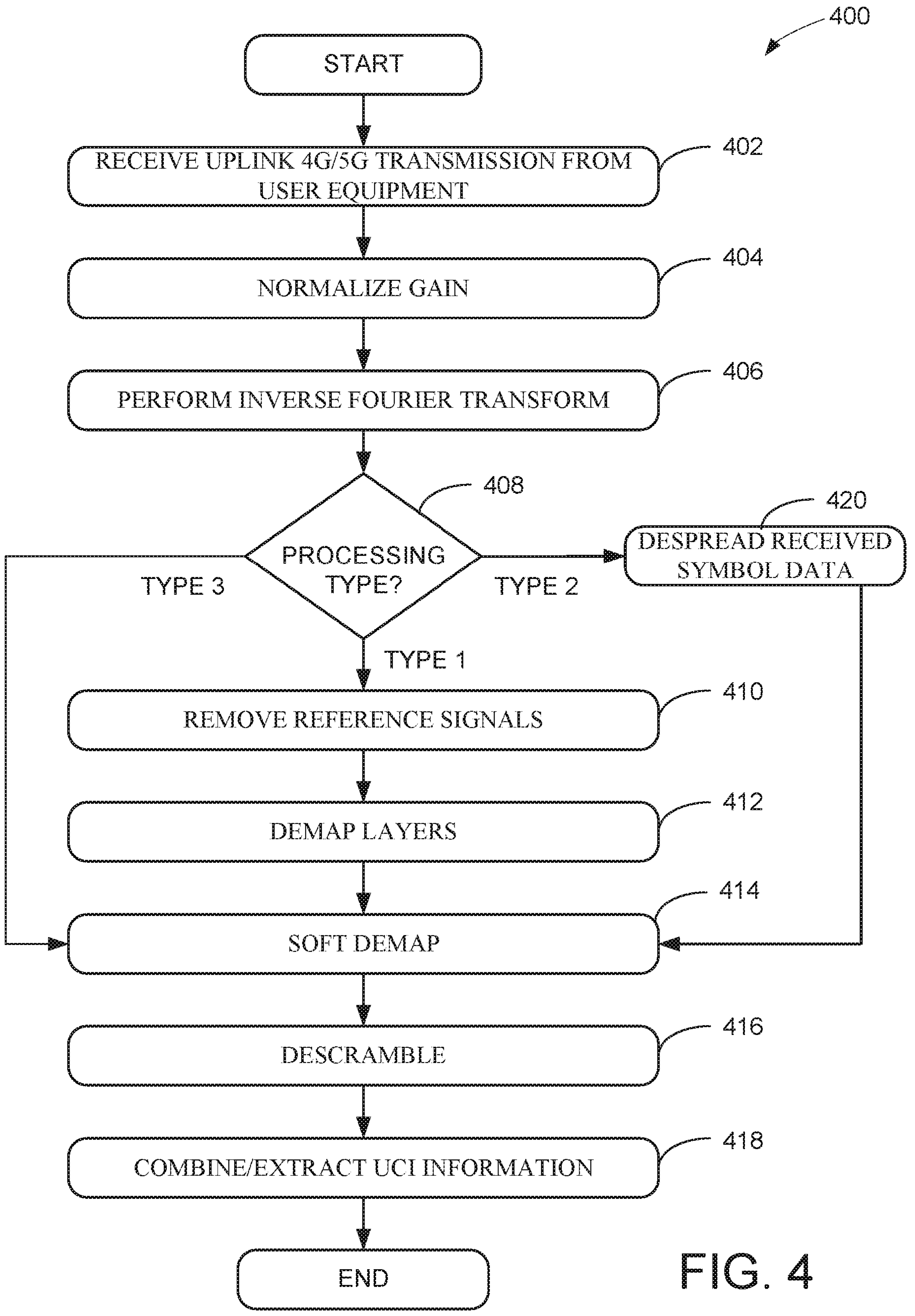
FIG. 4 shows an exemplary method for performing demapping in accordance with exemplary embodiments of a demapping system.

FIG. 4 shows an exemplary method 400 for performing demapping in accordance with exemplary embodiments of a demapping system. For example, the method 400 is suitable for use with the demapping system 152 shown in FIG. 2. In various exemplary embodiments, the method 400 operates to perform demapping operations for three processing types while reusing the same hardware of the demapping system 152, thereby providing fast and efficient demapping of received 4G and 5G uplink transmissions.

At block 402, uplink transmissions are received in a 4G/5G communication network. For example, the uplink communications are received at the front end 228 shown in FIG. 2.

At block 404, gain normalization is performed. For example, the gain normalization is performed by the gain normalizer 204 shown in FIG. 2.

At block 406, an inverse Fourier transform is performed to obtain time domain signals. For example, this process is performed by the IDFT block 206 shown in FIG. 2.

At block 408, a determination is made as to a type of processing to be performed. For example, a description of three processing types is provided above. If a first type of processing is to be performed, the method proceeds to block 410. If a second type of processing is to be performed, the method proceeds to block 420. If a third type of processing is to be performed, the method proceeds to block 414. For example, this operation is performed by the processing type detector 208 shown in FIG. 2.

At block 420, when the processing type is Type 2, despreading is performed on the received resource elements. For example, this operation is performed by the despreader 214 shown in FIG. 2. The method then proceeds to block 414.

When the processing type is Type 3, the method proceeds to block 414.

When the processing type is Type 1, the follow operations are performed.

At block 410, the reference signals are removed from the received resource elements. For example, resource elements containing RS/DTX are removed. This operation is performed by the RS remover 210 shown in FIG. 2.

At block 412, layer demapping is performed. For example, the resource elements without RS/DTX are layer demapped. This operation is performed by the layer demapper 212.

At block 414, soft demapping is performed. For example, the soft demapper 216 soft-demaps bits for each processing type. During processing Type 3, the soft demapper 216 receives the resource elements and soft demaps these bits to produce a soft-demapped output. During processing Type 2, the soft demapper 216 receives the despread bits from the despreader 214 and soft demaps these bits to produce a soft-demapped output. During processing Type 1, the soft demapper 216 receives the layer demapped bits from the layer demapper 212 and soft demaps these bits to produce a soft-demapped output.

At block 416, descrambling is performed. For example, the descrambler 218 receives the soft demapped bits from the soft demapper 216 and generates descrambled bits.

At block 418, combining and extraction of UCI information is performed. For example, the combiner/extractor 220 receives the descrambled bits, combines these bits, and extracts the UCI information.

Thus, the method 400 operates to provide demapping in accordance with the exemplary embodiments. It should be noted that the operations of the method 400 could be modified, added to, combined, deleted, rearranged, or otherwise changed within the scope of the embodiments.

Figure 5:
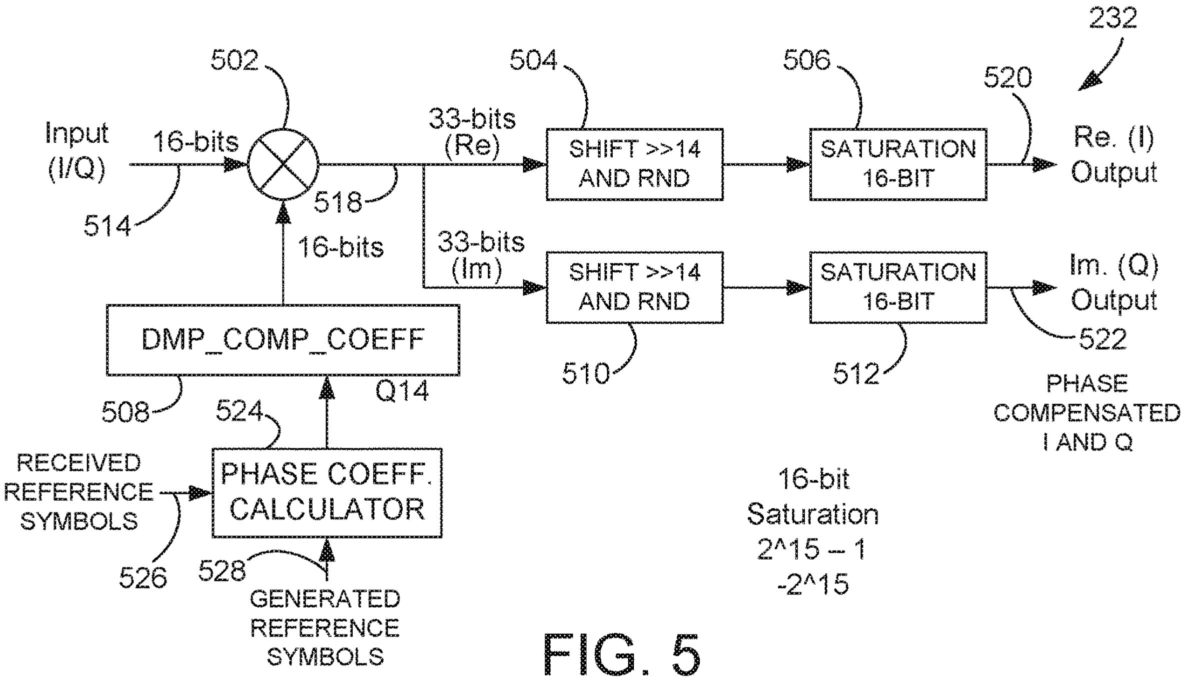
FIG. 5 shows an exemplary embodiment of a phase compensator for use in the soft demapper provided in the demapping system shown in FIG. 2.

FIG. 5 shows an exemplary embodiment of the phase compensator 232 for use in the soft demapper provided in the demapping system shown in FIG. 2. In an embodiment, the phase compensator 232 is configured to reduce phase noise especially in high frequency wireless communication systems for better communication quality. In an embodiment, the phase compensator 232 comprises multiplier 502, shift and rounding circuits 504, 510, saturation circuits 506, 512, and phase coefficient calculator 524 that calculates a phase compensation coefficient 508.

During operation, the phase coefficient calculator 524 calculates the phase compensation coefficient 508. In an embodiment, the calculator 524 receives as input received reference symbols 526 that are part of the received symbols 234 shown in FIG. 2. The calculator 524 also receives generated reference symbols 528 that are internally generated in another circuit of the demapping system 152. The calculator 524 determines a phase difference between the received symbols 234 and the generated symbols 528 and uses this difference to calculate the phase compensation coefficient 508 that is a fixed-point complex value represented in Q14 format. In an embodiment, the calculator 524 calculates up to four phase compensation coefficients for up to four layers.

The multiplier 502 receives I/Q bits 514 that comprise 16-bit values. The multiplier 502 also receives the phase compensation coefficient 508 that also comprises 16-bits. The multiplier multiples its inputs to generate an output 518 that comprises 33-bits representing real (Re) and imaginary (Im) parts that are input to the shift and rounding circuit 504 and the shift and rounding circuit 510, respectively.

The shift and rounding circuit 504 receive the Re bits and right shifts this Re input by 14-bits and rounds the result. The output of the shift and rounding circuit 504 is input to the saturation circuit 506. Likewise, the shift and rounding circuit 510 receives the Im bits and right shifts this Im input by 14-bits and rounds the result. The output of the shift and rounding circuit 510 is input to the saturation circuit 512.

The saturation circuit 506 adjusts a saturation level of the shifted and rounded Re bits. For example, the 16-bit saturation circuit 506 adjusts the saturation level of the shifted and rounded Re bits so as to maintain Re values within a range of ($2^{15}$-1 to $-2^{15}$). The saturation adjusted Re bits 520 are then output.

The saturation circuit 512 adjusts a saturation level of the shifted and rounded Im bits. For example, the 16-bit saturation circuit 512 adjusts the saturation level of the shifted and rounded Im bits so as to maintain Im values within a range of ($2^{15}$-1 to $-2^{15}$). The saturation adjusted Im bits 520 are then output. The Re bit 520 and Im bits 522 represent phase compensated I/Q bits that are input to the next stage of the soft demapper 216.

Figure 6:
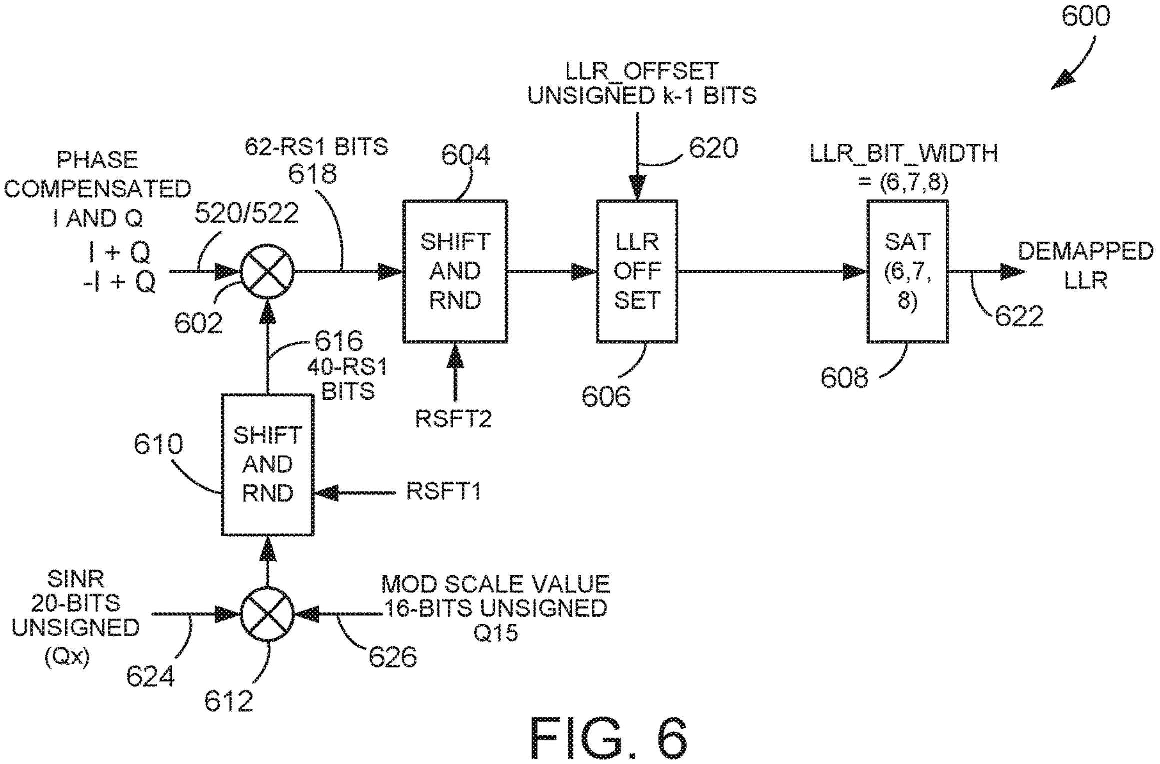
FIG. 6 shows an exemplary embodiment of the soft demapper provided in the demapping system shown in FIG. 2.

FIG. 6 shows an exemplary embodiment of a soft demapper 600 for use in the demapping system shown in FIG. 2. In an embodiment, the soft demapper 600 is suitable for use as the soft demapper 216 shown in FIG. 2. In an embodiment, the soft demapper 600 comprises multipliers 602, 612, shift and round (RND) circuits 604, 610, LLR offset circuit 606, and saturation circuit 608.

During operation, the soft demapper 600 receives the phase compensated I and Q bits 520/522 and multiplies these signals by a scaled SINR signal. For example, an SINR signal 624 is input to multiplier 612. A modulation (MOD) scale signal 626 is also input to the multiplier 612. An output of the multiplier 612 is input to the shift and round circuit 610 that shifts its input right by RSFT1 bits and rounds the result. The output of the shift and round circuit 610 is input the multiplier 602, which also receives the phase compensated I and Q bits 520/522. An output of the multiplier 602 is input to the shift and round circuit 604, which shifts it input right by RSFT2 bits and rounds the result. The output of the shift and round circuit 604 is input to the LLR offset circuit 606. An offset signal 620 is used to apply an offset and the resulting output is input to the saturation circuit 608 which adjusts a saturation level its input signal to generate the phase compensated soft demapped LLR signal 622.

Figure 7:
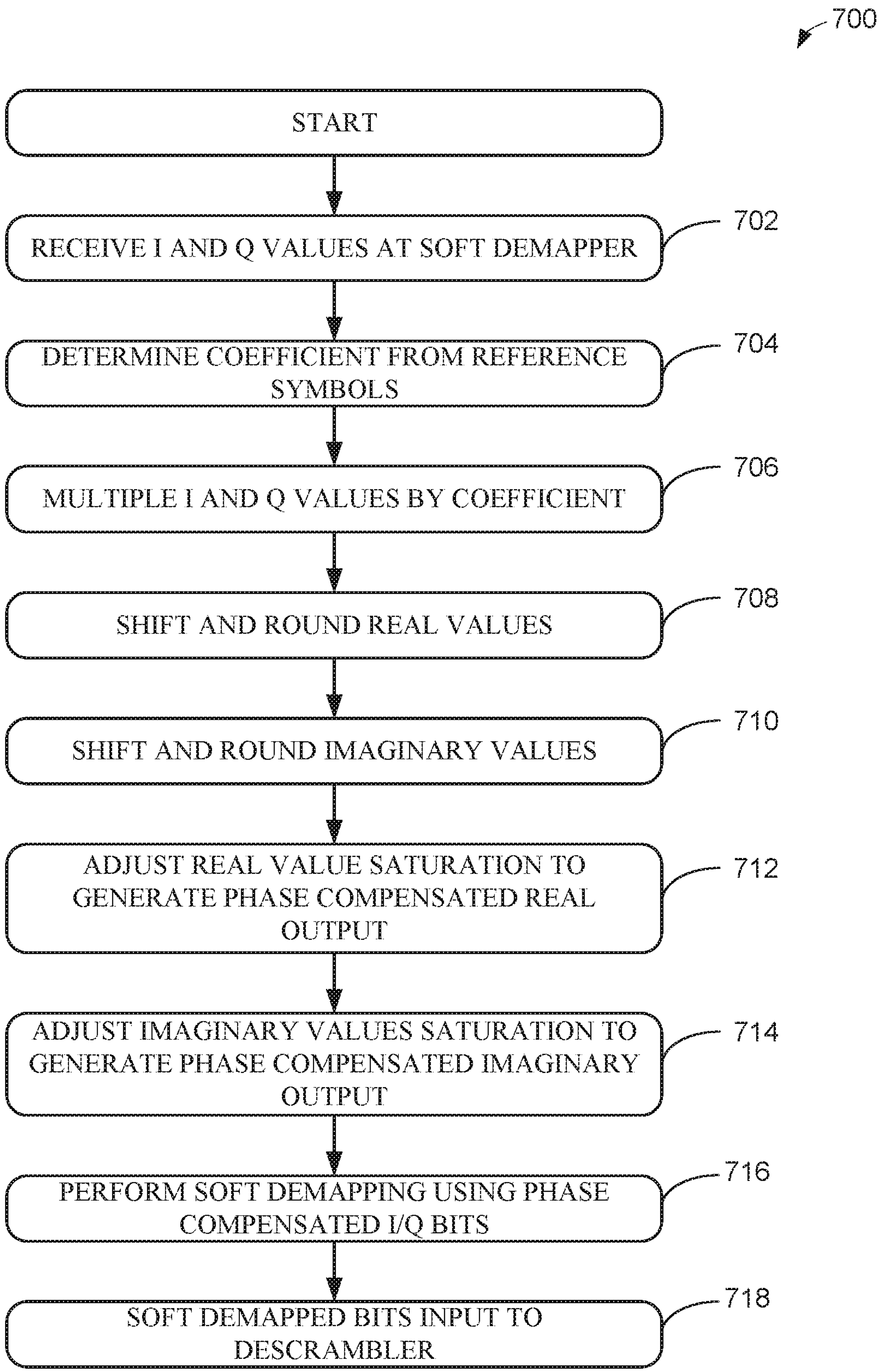
FIG. 7 shows an exemplary method for performing I/Q phase compensations for use with the soft demapper provided in the demapping system shown in FIG. 2.

FIG. 7 shows an exemplary method for performing I/Q phase compensation for use with the soft demapper 216 provided in the demapping system shown in FIG. 2. For example, the method 700 is suitable for use with the phase compensation circuit 232 shown in FIG. 4.

At block 702, I/Q bits are received at a soft demapper. For example, I/Q bits are received at the soft demapper 216 shown in FIG. 2. The I/Q bits can be received from any of the blocks 208, 212, or 214, as shown in FIG. 2. In an embodiment, the I/Q bits are received at the phase compensation circuit 232 of the soft demapper 216.

At block 704, a phase compensation coefficient is determined. For example, the phase coefficient calculator 524 calculates the compensation coefficient 508 by comparing the phase of internally generated reference symbols 528 to received reference symbols 526.

At block 706, the received I and Q bits are multiplied by the calculated coefficient. For example, the multiplier 502 multiples the I/Q bits 514 and the phase coefficient 508 to generate real (Re 33-bits) and imaginary (Im 33-bits) values.

At block 708, the Re values are shifted and rounded. For example, the Re bits are input to the shift and round circuit 504 where they are right shifted by 14-bits and then rounded.

At block 710, the Im values are shifted and rounded. For example, the Im bits are input to the shift and round circuit 510 where they are right shifted by 14-bits and then rounded.

At block 712, adjustment of a saturation level of the shifted and rounded Re bits is performed. For example, the 16-bit saturation circuit 506 adjusts the saturation level of the shifted and rounded Re bits so as to maintain Re values within a range of ($2^{15}$-1 to $-2^{15}$). The saturation adjusted Re bits 520 are then output.

At block 714, adjustment of a saturation level of the shifted and rounded Im bits is performed. For example, the 16-bit saturation circuit 512 adjusts the saturation level of the shifted and rounded Im bits so as to maintain Im values within a range of ($2^{15}$-1 to $-2^{15}$). The saturation adjusted Im bits 522 are then output.

At block 716, soft demapping is performed on the phase compensated I/Q bits. For example, the phase compensated I/Q bits 520/522 are input to the soft demapper 600 to generate soft demapped LLR bits 622.

At block 718, the soft demapped LLR bits 622 are input to the descrambler 218.

Thus, the method 700 operates to provide phase compensated soft demapping in accordance with the exemplary embodiments. It should be noted that the operations of the method 700 could be modified, added to, combined, deleted, rearranged, or otherwise changed within the scope of the embodiments.

Figure 8:
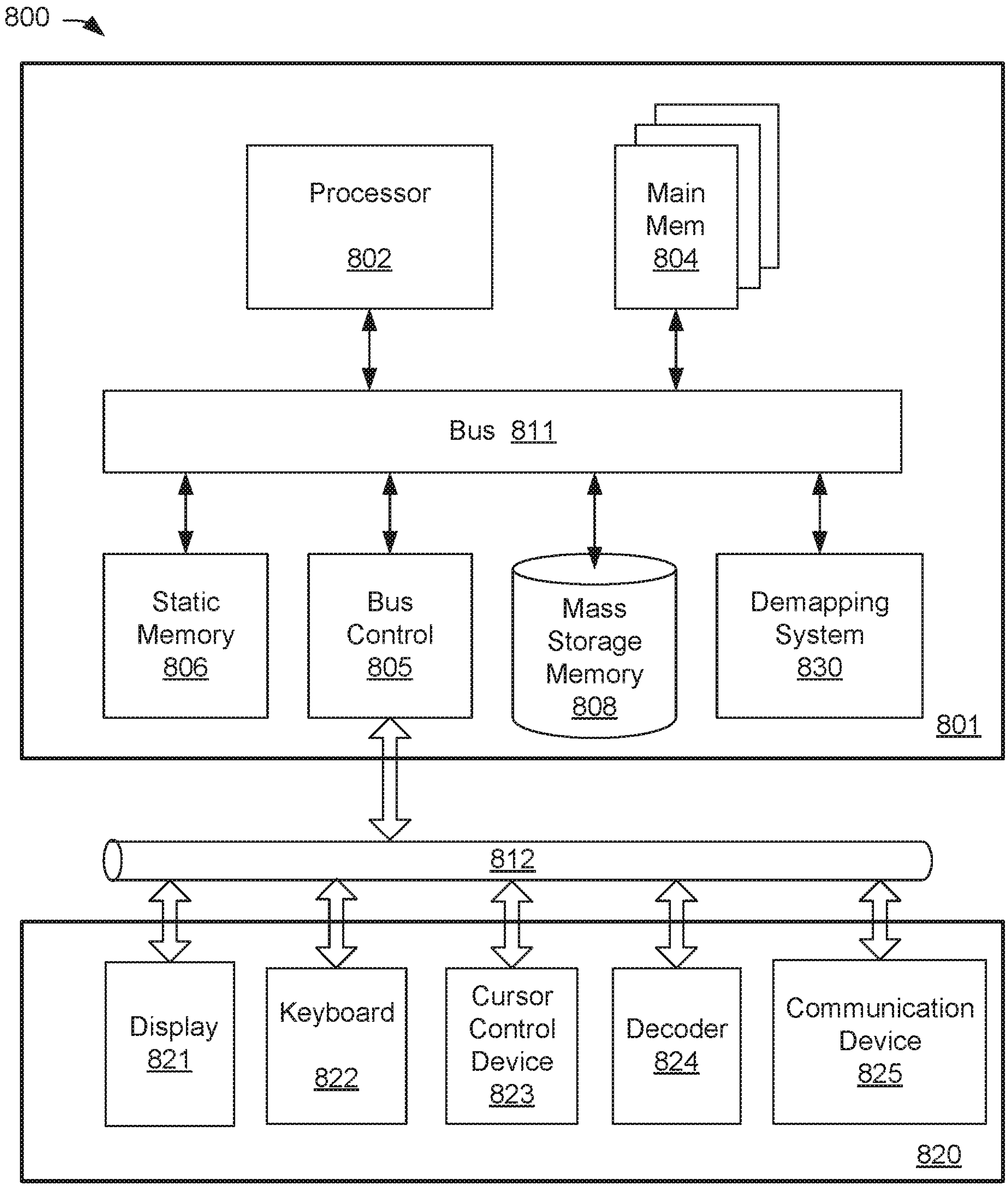
FIG. 8 is a block diagram illustrating a processing system having an exemplary embodiment of a demapping system.

FIG. 8 is a block diagram illustrating a processing system 800 having an exemplary embodiment of a demapping system 830. It will be apparent to those of ordinary skill in the art that other alternative computer system architectures may also be employed.

The system 800 includes a processing unit 801, an interface bus 812, and an input/output ("IO") unit 820. Processing unit 801 includes a processor 802, main memory 804, system bus 811, static memory device 806, bus control unit 805, and mass storage memory 808. Bus 811 is used to transmit information between various components and processor 802 for data processing. Processor 802 may be any of a wide variety of general-purpose processors, embedded processors, or microprocessors such as ARM® embedded processors, Intel® Core™2 Duo, Core™2 Quad, Xeon®, Pentium™ microprocessor, AMD® family processors, MIPS® embedded processors, or Power PC™ microprocessor.

Main memory 804, which may include multiple levels of cache memories, stores frequently used data and instructions. Main memory 804 may be RAM (random access memory), MRAM (magnetic RAM), or flash memory. Static memory 806 may be a ROM (read-only memory), which is coupled to bus 811, for storing static information and/or instructions. Bus control unit 805 is coupled to buses 811-812 and controls which component, such as main memory 804 or processor 802, can use the bus. Mass storage memory 808 may be a magnetic disk, solid-state drive ("SSD"), optical disk, hard disk drive, floppy disk, CD-ROM, and/or flash memories for storing large amounts of data.

I/O unit 820, in one example, includes a display 821, keyboard 822, cursor control device 823, decoder 824, and communication device 825. Display device 821 may be a liquid crystal device, flat panel monitor, cathode ray tube ("CRT"), touch-screen display, or other suitable display device. Display 821 projects or displays graphical images or windows. Keyboard 822 can be a conventional alphanumeric input device for communicating information between computer system 800 and computer operators. Another type of user input device is cursor control device 823, such as a mouse, touch mouse, trackball, or other type of cursor for communicating information between system 800 and users.

Communication device 825 is coupled to bus 812 for accessing information from remote computers or servers through wide-area network. Communication device 825 may include a modem, a router, or a network interface device, or other similar devices that facilitate communication between computer 800 and the network. In one aspect, communication device 825 is configured to perform wireless functions. Alternatively, demapping system 830 and communication device 825 perform the demapping functions in accordance with one embodiment of the present invention.

The demapping system 830, in one aspect, is coupled to bus 811 and is configured to demap received uplink communications as described above to improve overall receiver performance. The demapping system 830 comprises hardware, firmware, or a combination of hardware and firmware.

While particular embodiments of the present invention have been shown and described, it will be obvious to those skilled in the art that, based upon the teachings herein, changes and modifications may be made without departing from these exemplary embodiments of the present invention and its broader aspects. Therefore, the appended claims are intended to encompass within their scope all such changes and modifications as are within the true spirit and scope of this exemplary embodiments of the present invention.

What is claimed is:

1. An apparatus, comprising:

an equalizer configured to:

receive a plurality of symbols of an uplink transmission in a wireless communication system having a plurality of subcarriers per a physical resource block (PRB);

perform an equalization operation on each of the plurality of received symbols of uplink transmission, wherein the equalization operation involves an equalization weight matrix;

calculate the equalization weight matrix for the equalization operation using a process for inversion of a first matrix, wherein the process includes a modified backward substitution step that calculates a second matrix during calculation of the inversion of the first matrix.

2. The apparatus of claim 1, wherein:

the wireless communication system is one of Discrete Fourier Transform-spread Orthogonal Frequency-Division Multiplexing (DFT-s-OFDM) or 5G New Radio Cyclic Prefix (CP)-OFDM (5G NR CP-OFDM).

3. The apparatus of claim 1, wherein:

the equalization operation is minimum mean-squared error (MMSE)-based, which reduces the mean square error (MSE) of the plurality of received symbols.

4. The apparatus of claim 1, wherein:

the equalizer is configured to have the modified backward substitution step utilize a lower triangular matrix for the inversion of the first matrix.

5. The apparatus of claim 4, wherein:

the equalizer is configured to obtain the lower triangular matrix from a noise covariance matrix via a Cholesky decomposition step of the process for matrix inversion.

6. The apparatus of claim 1, wherein:

the equalizer is configured to have the modified backward substitution step to calculate the second matrix using an identity matrix.

7. The apparatus of claim 6, wherein:

the equalizer is configured to have the modified backward substitution step include the identity matrix as an addend in addition to a conventional backward substitution step.

8. The apparatus of claim 1, wherein:

the modified backward substitution step of the process is preceded by a forward substitution step for the process of the inversion of the first matrix.

9. The apparatus of claim 1, further comprising:

a gain normalizer configured to perform a gain normalization operation on the plurality of received symbols following the equalization operation.

10. A method, comprising:

receiving a plurality of symbols of an uplink transmission in a wireless communication system having a plurality of subcarriers per a physical resource block (PRB);

performing an equalization operation on each of the plurality of received symbols of uplink transmission, wherein the equalization operation involves an equalization weight matrix;

calculating the equalization weight matrix for the equalization operation using a process for inversion of a first matrix, wherein the process includes a modified backward substitution step that calculates a second matrix during calculation of the inversion of the first matrix.

11. The method of claim 10, wherein:

the wireless communication system is one of Discrete Fourier Transform-spread Orthogonal Frequency-Division Multiplexing (DFT-s-OFDM) or 5G New Radio Cyclic Prefix (CP)-OFDM (5G NR CP-OFDM).

12. The method of claim 10, wherein:

the equalization operation is minimum mean-squared error (MMSE)-based, which reduces the mean square error (MSE) of the plurality of received symbols.

13. The method of claim 10, further comprising:

having the modified backward substitution step utilize a lower triangular matrix for the inversion of the first matrix.

14. The method of claim 13, further comprising:

obtain the lower triangular matrix from a noise covariance matrix via a Cholesky decomposition step of the process for matrix inversion.

15. The method of claim 10, further comprising:

having the modified backward substitution step to calculate the second matrix using an identity matrix.

16. The method of claim 15, further comp5rising:

having the modified backward substitution step include the identity matrix as an addend in addition to a conventional backward substitution step.

17. The method of claim 10, further comprising:

preceding the modified backward substitution step of the process by a forward substitution step for the process of matrix inversion.

18. The method of claim 10, further comprising:

performing a gain normalization operation on the plurality of received symbols following the equalization operation.

19. An apparatus, comprising:

means for receiving a plurality of symbols of an uplink transmission in a wireless communication system having a plurality of subcarriers per a physical resource block (PRB);

means for performing an equalization operation on each of the plurality of received symbols of uplink transmission, wherein the equalization operation involves an equalization weight matrix;

means for calculate the equalization weight matrix for the equalization operation using a process for inversion of a first matrix, wherein the process includes a modified backward substitution step that calculates a second matrix during calculation of the inversion of the first matrix.

* * * * *